(12) United States Patent  
Simon et al.

(10) Patent No.: US 10,408,279 B2  
(45) Date of Patent: Sep. 10, 2019

(54) BRAKE CLUTCH CONNECTION

(71) Applicant: Ford Global Technologies, LLC, Dearborn, MI (US)

(72) Inventors: Bernard Simon, Troy, MI (US); James Glenn Gibboney, Livonia, MI (US); Jason Michael Sanderson, West Bloomfield, MI (US); Dennis Neil Wys, Ann Arbor, MI (US); Heng Liu, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 309 days.

(21) Appl. No.: 15/447,624

(22) Filed: Mar. 2, 2017

(65) Prior Publication Data

US 2018/0252298 A1 Sep. 6, 2018

(51) Int. Cl.

| F16H 63/30 | (2006.01) |
|---|---|
| F16D 13/52 | (2006.01) |
| F16D 67/02 | (2006.01) |
| F16H 57/10 | (2006.01) |
| F16H 57/00 | (2012.01) |
| F16H 3/66 | (2006.01) |
| F16H 57/08 | (2006.01) |

(52) U.S. Cl.
CPC ............. *F16D 13/52* (2013.01); *F16D 67/02* (2013.01); *F16H 57/0006* (2013.01); *F16H 57/10* (2013.01); *F16H 3/66* (2013.01); *F16H 2057/087* (2013.01); *F16H 2200/0069* (2013.01); *F16H 2200/2012* (2013.01); *F16H 2200/2046* (2013.01)

(58) Field of Classification Search  
CPC .......... F16H 2057/087; F16H 57/0006; F16H 63/30; F16H 57/10; F16D 13/52  
See application file for complete search history.

(56) References Cited

U.S. PATENT DOCUMENTS

| 8,092,194 B2 | 1/2012 | Fischer et al. |
| 8,834,310 B2 * | 9/2014 | Goleski ............... F16H 63/3026 475/138 |
| 9,261,186 B2 * | 2/2016 | Singh .................... F16D 25/087 |
| 9,429,226 B2 | 8/2016 | Ike et al. |
| 2017/0234410 A1 * | 8/2017 | Ueda ...................... F16H 57/10 475/116 |
| 2017/0314649 A1 * | 11/2017 | Michikoshi ............. F16H 57/12 |

\* cited by examiner

*Primary Examiner* — Sherry L Estremsky  
(74) *Attorney, Agent, or Firm* — David Kelley; Brooks Kushman P.C.

(57) ABSTRACT

A transmission is provided. The transmission may include a planetary gearset. The transmission may also include a thrust hub that may be fixed to the planetary gearset and engaged with a thrust bearing. A clutch hub may be connected with and spaced away from the thrust hub such that the thrust and clutch hubs are not in contact with each other to reduce vibration transfer between the thrust and clutch hubs.

10 Claims, 3 Drawing Sheets

BRAKE CLUTCH CONNECTION

TECHNICAL FIELD

This disclosure relates to the field of automatic transmissions for motor vehicles. More particularly, the disclosure pertains to a clutch hub designed to reduce noise and vibrations.

BACKGROUND

Clutches within automatic transmission provide a selective mechanical connection between a planetary gear element and a transmission housing. When the clutch is disengaged or "off," an element, that may include a sun gear, carrier or ring gear is permitted to rotate. When the clutch is engaged or "on," the element is mechanically connected to the housing and is held stationary. When the element is mechanically connected to the housing, vibrations and noise may travel from within the transmission through the clutch to the vehicle frame.

SUMMARY

According to one embodiment of this disclosure, a transmission is provided. The transmission may include a planetary gearset. The transmission may also include a thrust hub that may be fixed to the planetary gearset and engaged with a thrust bearing. A clutch hub may be connected with and spaced away from the thrust hub such that the thrust and clutch hubs are not in contact with each other to reduce vibration transfer between the thrust and clutch hubs.

According to another embodiment a transmission is provided. The transmission may include a planetary gearset having a ring gear. A thrust hub may be fixed to the ring gear and engaged with a thrust bearing. A clutch hub may be connected with and spaced away from the thrust and clutch hubs such that the thrust and clutch hubs are not in contact with each other to reduce vibration transfer between the thrust and clutch hubs.

The transmission may also include a clutch brake attached to a transmission case. The clutch brake may include a plurality of friction plates that may be configured to engage the clutch hub to selectively hold either the ring gear, or a sun gear, or a carrier against rotation.

According to yet another embodiment, a transmission is disclosed. The transmission may include a planetary gearset. A thrust hub may be fixed to the planetary gearset and may be engaged to a thrust bearing. The transmission may also include a brake including a plurality of friction plates. A clutch hub may be selectively engaged with the plurality of friction plates and connected with and spaced away from the thrust hub such that the thrust and clutch hubs are not in contact with one each other to reduce vibration transfer between the thrust and clutch hubs.

The planetary gearset may include a ring gear, a sun gear or a carrier. The thrust hub may be fixed to either the ring gear, sun gear, or carrier.

The clutch hub may have a plurality of internal spline teeth selectively engaged with a plurality of external spline teeth of an external spline.

The transmission may also include a snap ring engaged with the external spline and clutch hub to limit axial movement of the clutch hub.

The thrust hub may define a plurality of apertures that cooperate with a plurality of fingers of extending from a finger spline fixed to the clutch hub.

The thrust hub and the clutch hub may be spaced apart by a predetermined distance. The predetermined distance may be at least one-hundred micrometers.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
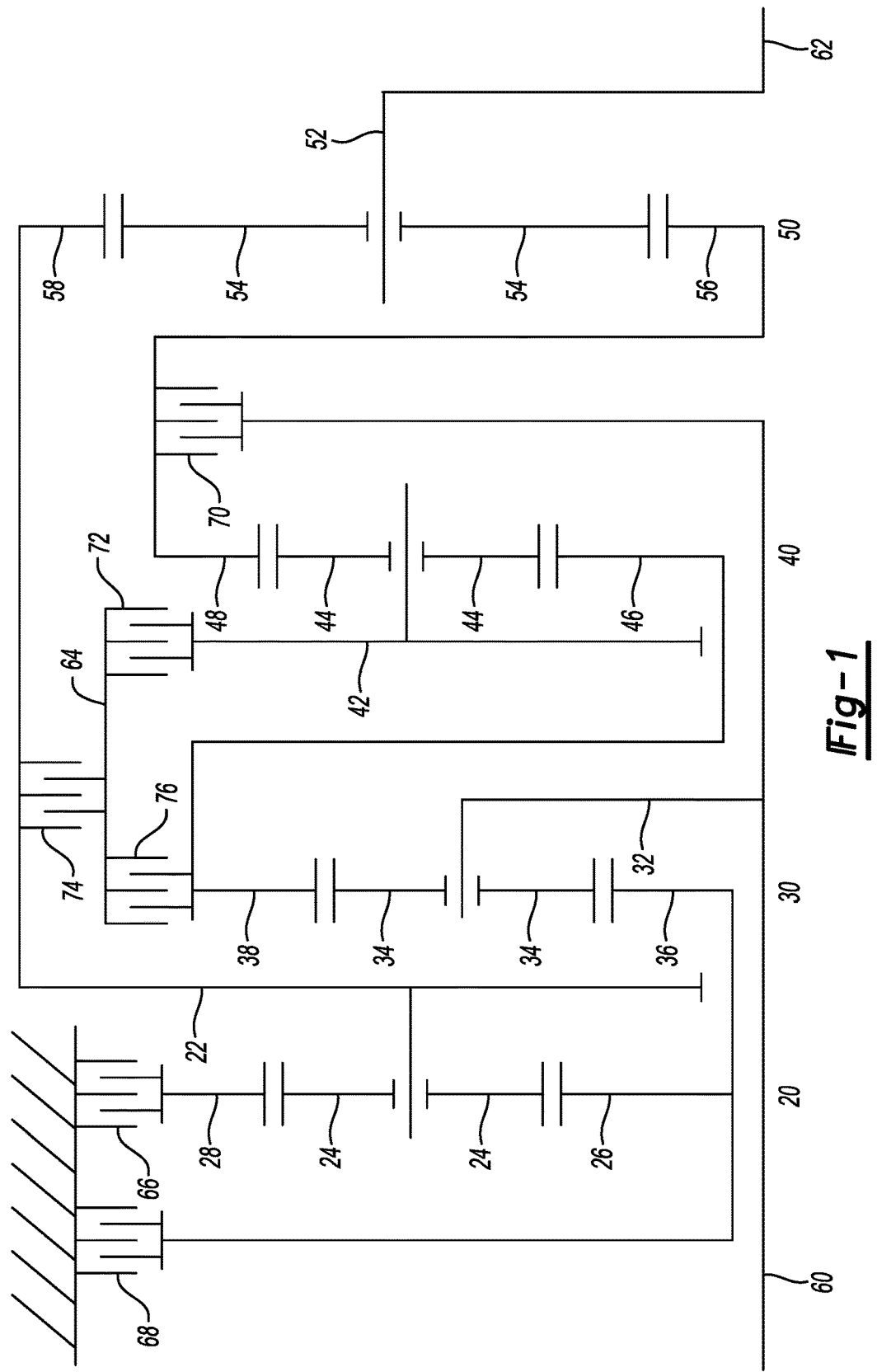
FIG. 1 is a schematic representation of a transmission kinematic arrangement.

FIG. 1 illustrates a kinematic arrangement for a 10 speed automatic transmission. Four simple planetary gear sets 20, 30, 40, and 50 each have a carrier supporting a set of planet gears with each planet gear meshing with a sun gear and a ring gear. Sun gears 26 and 36 are fixedly coupled. Carrier 22 is fixedly coupled to ring gear 58, ring gear 38 is fixedly coupled to sun gear 46. Ring gear 48 is fixedly coupled to sun gear 56. Input 60 is fixedly coupled to carrier 32. Output 62 is fixedly coupled to carrier 22. Brake 66 selectively holds ring gear 28 against rotation. Brake 68 selectively holds sun gears 26 and 36 against rotation. Clutch 70 selectively couples input 60 and carrier 32 to ring gear 48 and sun gear 56. Intermediate shaft 64 is selectively coupled to carrier 42 by clutch 72, selectively coupled to carrier 22 and ring gear 58 by clutch 74, and selectively coupled to ring gear 38 and sun gear 46 by clutch 76. A group of elements are fixed or fixedly coupled to one another if they are constrained to rotate as a unit in all operating conditions. Elements can be fixedly coupled by spline connections, welding, press fitting, machining from a common solid, or other means.

Figure 2:
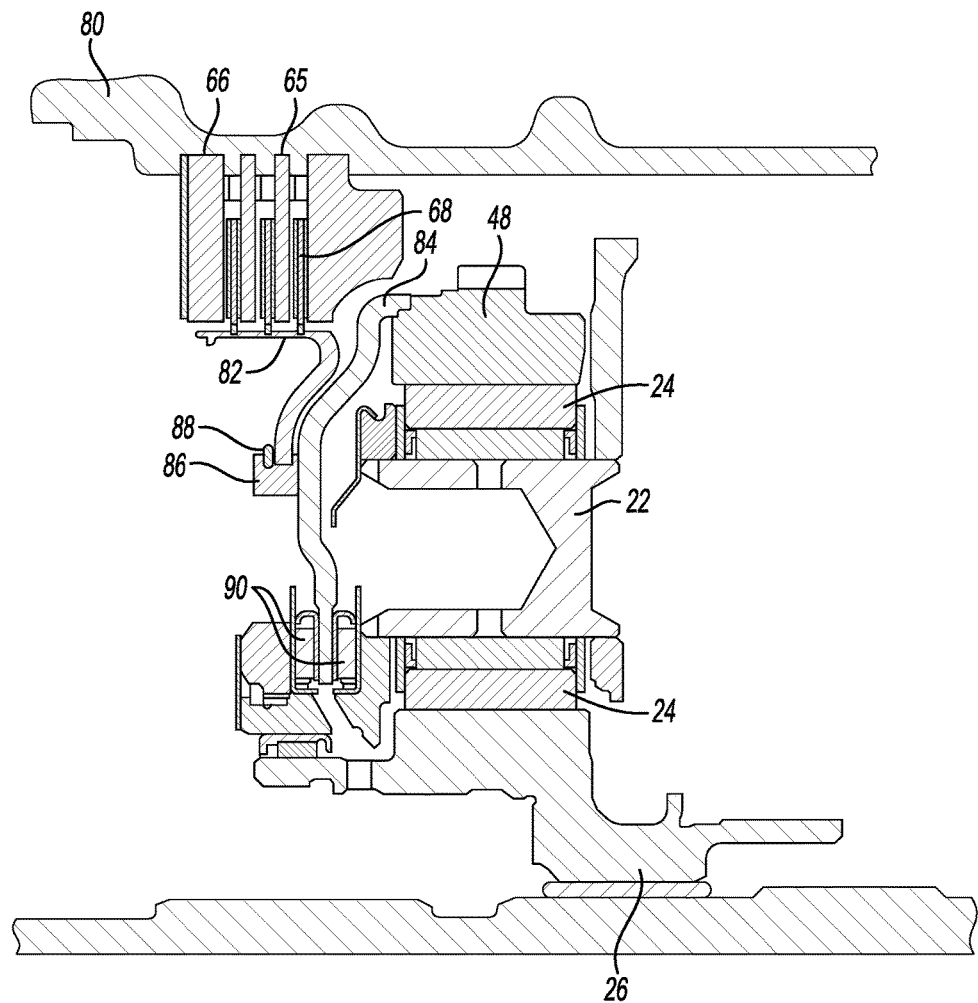
FIG. 2 is a cross section of a portion of a transmission according to at least one embodiment of this disclosure.
Figure 3:
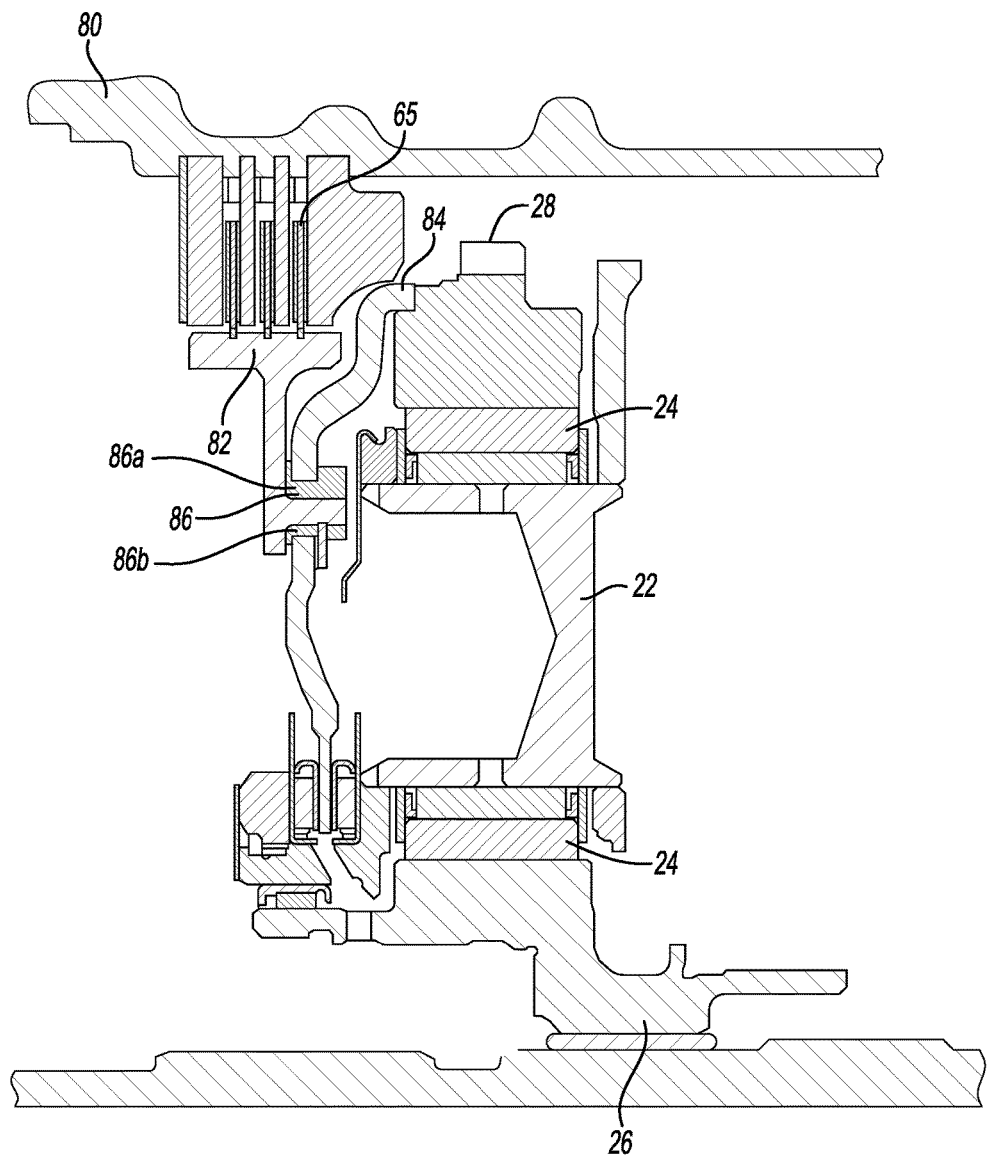
FIG. 3 is a cross section of a portion of a transmission according to at least one embodiment of this disclosure.

FIG. 2 and FIG. 3 each illustrate a partial cross section of a 10 speed automatic transmission according to at least one embodiment. Planet gear 34 is supported for rotation with respect to the carrier 22 by roller bearings. The ring gear 28 meshes with planet gear 24 and is attached to the thrust hub 84. The thrust hub 84 extends to and is coupled to the thrust bearing 90. The thrust hub 84 is an element that transmits torque as it is rotated and thrust as it moves axially within the transmission. A spline 86 is fixed to the thrust hub 84 and is fixedly coupled to the clutch hub 82. While a spline is shown as connecting the thrust hub to the clutch hub, other suitable methods of attachment may be utilized. The clutch hub 82 is held in place by an external snap ring 88 to limit axial movement of the clutch hub 82. There may be a gap between the clutch hub 82 and the thrust hub 84. The gap may range between 100 microns to 1 mm. Brake 66 includes a plurality of friction plates 68 splined to the clutch hub 82 and are interleaved with a plurality of separator plates 65 attached to the housing 80. Referring specifically to FIG. 3, the clutch hub 82 is splined to the thrust hub 84 by a finger spline 86. Here, the thrust hub 84 defines a plurality of apertures that are aligned with the finger spline 86 connected to the clutch hub 82. The finger spline 86 shown in FIG. 3 includes a top finger 86*a* and a bottom finger 86*b*, each of which are engaged with the apertures defined by the thrust plate 84.

As was mentioned above, the brake clutch 66 selectively stops or holds the ring gear 28, sun gear 26, or carrier 22 in a fixed position. Noise and vibrations may originate from the interaction between the ring gear 28, sun gear 26 or carrier 22. More specifically, gearsets are designed to have clearance or backlash between their respective gear profiles. As one of the gears is stopped, the gear the stopped gear is engaged noise is generated as the two gears come into contact with one another. Because the brake clutch 66 is connected to the transmission case which in turn is connected to the frame of the vehicle, noise and vibrations originated from the ring gear 28, sun gear 26 or carrier 22 translates through the brake clutch 66, through the case, and to the vehicle frame where it may be perceived by a driver or passenger of the vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A transmission comprising:
   a planetary gearset;
   a thrust hub fixed to the planetary gearset and engaged with a thrust bearing; and
   a clutch hub connected with and spaced away from the thrust hub such that the thrust and clutch hubs are not in contact with each other to reduce vibration transfer between the thrust and clutch hubs, wherein the thrust hub defines a plurality of apertures and wherein the plurality of apertures cooperate with a plurality of fingers extending from a finger spline fixed to the clutch hub.

2. The transmission of claim 1 further comprising:
   a plurality of separator plates splined to a transmission case; and
   a plurality of friction plates splined to the clutch hub.

3. The transmission of claim 1, wherein the clutch hub is spaced away from the thrust hub by at least one-hundred micrometers.

4. The transmission of claim 1, wherein the planetary gearset is comprised of a ring gear, a planet gear and a carrier, and wherein the thrust hub is fixed to either the ring gear, planet gear or carrier.

5. A transmission comprising:
   a planetary gearset having a ring gear;
   a thrust hub fixed to the ring gear and engaged with a thrust bearing; and
   a clutch hub connected with and spaced away from the thrust hub such that the thrust and clutch hubs are not in contact with each other to reduce vibration transfer between the thrust and clutch hubs, wherein the thrust hub defines a plurality of apertures that cooperate with a plurality of fingers extending from a finger spline fixed to the clutch hub.

6. The transmission of claim 5 further comprising a clutch brake attached to a case of the transmission and including a plurality of friction plates configured to engage the clutch hub to selectively hold the ring gear.

7. The transmission of claim 5, wherein the clutch hub is spaced away from the thrust hub by at least one-hundred micrometers.

8. A transmission comprising:
   a planetary gearset;
   a thrust hub fixed to the planetary gearset and engaged with a thrust bearing;
   a brake including a plurality of friction plates; and
   a clutch hub selectively engaged with the plurality of friction plates and connected with and spaced away from the thrust hub such that the thrust and clutch hubs are not in contact with each other to reduce vibration transfer between the thrust and clutch hubs, wherein the thrust hub defines a plurality of apertures that cooperate with a plurality of fingers extending from a finger spline fixed to the clutch hub.

9. The transmission of claim 8, wherein the planetary gearset comprises a ring gear, a sun gear and a carrier, and wherein the thrust hub is connected to either the ring gear, sun gear or carrier.

10. The transmission of claim 8, wherein the clutch hub is spaced away from the thrust hub by at least one-hundred micrometers.

* * * * *